3,226,210
MICROBIOCIDES IN HYDROCARBON FUEL COMPOSITIONS
James N. Baptist, Clarksville, Paul R. Steyermark, Silver Spring, and Preston L. Veltman, Severna Park, Md., assignors to W. R. Grace & Co., New York, N.Y., a corporation of Connecticut
No Drawing. Filed Mar. 5, 1963, Ser. No. 263,077
7 Claims. (Cl. 44—66)

This application is a continuation-in-part of our previously filed application Serial No. 109,248 filed May 11, 1961, now abandoned.

The present invention relates to a method for treating hydrocarbon fuels, and more specifically to a method of inhibiting the growth of microorganisms in liquid hydrocarbon fuels.

Modern internal combustion engines, particularly those employed in high-speed aircraft, are extremely complex, finely adjusted mechanisms which require tremendous quantities of specially blended high-quality fuel. Fuels which are supplied to these engines must not only be of correct chemical compositions but must also be of extremely high purity. Any fuel which contains the slightest traces of solid impurity is apt to clog and cause malfunction of delicate engine parts such as control valves, injection nozzles, and so forth.

To prevent any possible mal-function due to contaminated fuel it has heretofore been the practice of fuel manufacturers, distributors and users to subject their fuel products to regular filtering procedures at each point of handling. These filtering procedures are particularly adhered to by aircraft users to whom an engine failure is obviously particularly serious.

While prior art filtering procedures serve to successfully remove most solid contaminate particles falling within a certain size range as well as certain amounts of liquid impurities such as water, which almost always accumulate in fuel from the atmosphere during storage, these filtering procedures serve to remove only the impurities present in the fuel at the time of filtration, and obviously cannot provide protection against subsequent contamination after filtration.

It has been found, however, that a primary source of fuel contamination and associated fuel tank corrosion is brought about by the development of microorganisms which rapidly multiply at the fuel-water interphase of a hydrocarbon fuel which contains traces of moisture. Since a certain amount of moisture is almost always present in hydrocarbon fuels which are stored in tanks vented to the atmosphere, it is generally axiomatic that substantial and damaging amounts of microorganisms may grow under most any normal storage conditions. All that is required to produce a large and dangerous concentration of microorganism material in stored fuel is an inoculative amount of bacteria culture. This inoculum may be provided from numerous sources, such as contaminated fuel storage or handling equipment, contaminated fuel samples, airborne contamination entering through vent-pipes and so forth. It is also found that inoculative amounts of microorganisms may easily pass through most standard filtering cells presently in use, hence, it is found that microorganism growth may not be entirely prevented by periodic filtering procedures once a fuel handling facility has become contaminated or a body of fuel has been inoculated.

It is therefore an object of the present invention to provide a method by which the development of microorganisms in liquid hydrocarbon fuels may be controlled.

It is another object to provide a method by which microorganisms induced corrosion in fuel systems may be prevented.

It is yet another object of the present invention to provide a convenient and efficient method by which hydrocarbon fuels may be treated to stabilize them against subsequent microorganism development.

It is a further object of the present invention to provide a filtering means which may be used to remove substantial solid contaminates and to inhibit subsequent microorganism development in hydrocarbon fuel.

It is still another object of the present invention to provide a hydrocarbon fuel which is stabilized against microorganism activity.

These and still further objects of the present invention will become readily apparent to one skilled in the art from the following detailed description and examples.

Broadly, the present invention contemplates the stabilizing of hydrocarbon fuels against microorganisms development by incorporating in said fuel a minor amount of a silver derivative which has antimicrobial activity.

More specifically, the invention involved a means for stabilizing hydrocarbon fuels against undesirable microorganisms growth which comprises establishing and maintaining a concentration of water soluble silver compound in the fuel of from about 10 parts per billion to about 10 parts per million by weight. This silver concentration is obtained by admixing a silver compound which is characterized by possessing a solubility in the fuel and in water of at least about 10 p.p.b.

Silver compounds which possess the required solubility characteristic are numerous and diverse. In general, suitable compounds are characterized by possessing a structure which incorporates silver with an organic substituent which tends to render the compound soluble in hydrocarbon. Typical examples of silver compounds which may be used are silver salts of organic acids such as silver carboxylates, and silver salts of organic substituent inorganic acids such as silver sulfonates, sulfates, and phosphates. Furthermore, silver compounds such as silver acetylides and dithiocarbamates may be used as a source of soluble silver.

It is generally believed that the microorganism inhibiting effect obtained by using soluble silver compounds is due to the silver ions which are distributed throughout the fuel composition including water phases which are almost invariably present. Therefore, solubility is required both in hydrocarbon fuel and in any water phase which is present.

If the silver compound is exclusively soluble in the hydrocarbon phase it will not act effectively as a microbiocide. This is due to the fact the microorganism growth appears to concentrate in any water phase which is present. Particularly rapid growth is observed at a fuel-water interface. Thus, the silver compound must be soluble in the hydrocarbon so that active amounts may be incorporated therein, and furthermore the silver compound must be capable of dissolving in water phases where microorganism growth is concentrated.

Using these criteria of solubility one skilled in the art may easily select any one of many silver compounds which may be used to practice the present invention. Silver compounds such as silver iodide which has a solubility of only about 3 p.p.b. in water and which because of its inorganic nature would be expected to be even less soluble in hydrocarbon, would not be suitable. Furthermore, it is seen that a hydrocarbon soluble-water insoluble compound such as silver dodecyl mercaptide, or an exclusively water soluble hydrocarbon insoluble compound such as silver nitrate could not be used. These generalizations are borne out by experimental evidence.

Typical silver compounds which possess the required water and hydrocarbon solubility (but by no means all of them) are as follows:

(1) Silver carboxylates having the general formula

$$(R_1COO^-)Ag^+$$

wherein $R_1$ represents an organic radical having at least 4 carbon atoms. Typical examples of $R_1$ are alkyl and alkene having 4 to 36 carbon atoms; aryl such as phenyl, and polynuclear benezene structures having up to about 6 units. It is also contemplated that $R_1$ may be substituted by halogen, hydroxyl, cyanate, oxyloweralkyl, and oxirane groups in one or more positions.

(2) Silver sulfonates having the formula:

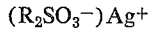
$$(R_2SO_3^-)Ag^+$$

wherein $R_2$ is an alkyl or alkene radical having 6 to 36 carbon atoms; and aryl and arylalkyl such as phenyl and phenyl alkyl wherein the alkyl substituent has from 1 to about 16 carbon atoms.

(3) Silver dithiocarbamates having the formula:

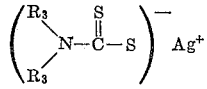
$$\left(\begin{array}{c}R_3\\ \\R_3\end{array}\!\!\!>\!\!N-\overset{\overset{\displaystyle S}{\|}}{C}-S\right)^{\!\!-}Ag^+$$

wherein R represents alkyl radicals the total of which contain at least 8 carbon atoms. Thus, $R_3$ may be an alkyl radical having from about 1 to about 16 carbon atoms.

(4) Silver sulfates having the formula:

$$(R_4OSO_3^-)Ag^+$$

wherein $R_4$ represents an alkyl radical having 6 to about 36 carbon atoms.

(5) Silver phosphates having the formula:

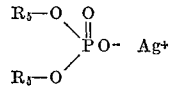
$$\begin{array}{c}R_5-O\\ \phantom{R_5-}\diagdown\!\!\overset{\displaystyle O}{\overset{\|}{P}}\!\!-O^-\ Ag^+\\ \phantom{R_5-}\diagup\\ R_5-O\end{array}$$

wherein both $R_5$ radical total at least 6 carbon atoms between them. $R_5$ may represent alkyl radicals having 1 to 16 carbon atoms.

(6) Silver acetylides having the formula:

$$R_6C\!\!\equiv\!\!CAg$$

wherein $R_6$ represents an alkyl radical having from 4 to about 24 carbon atoms.

The above series of general formulae only partially indicates the great number of silver compounds that may be utilized in the practice of the present invention. Using the compounds given above as a general guide one skilled in the art could readily develope any number of silver compounds which possess the required solubility—namely a solubility in water and in hydrocarbon of at least 10 p.p.b.

The presently intended silver compounds are used in amounts which will impart a concentration of soluble silver to the fuel and any associate water phases being treated of at least 10 p.p.b. by weight up to about 10 p.p.m. More than 10 p.p.m. silver may be imparted to the fuel if desired, however it is found that when this limit is exceeded, relatively little increase in microbiocidal effect is observed, and as a matter of fact a water-fuel soluble concentration of more than about 1 p.p.m. is seldom required. An excess of 1 p.p.m. silver is added primarily to surround any detoxifying ingredients in the fuel.

Ideally, just enough silver compound is added which will impart the required silver concentration of 10 p.p.b. to about 10 p.p.m. However, when silver deactivating contaminates, such as mercaptans, are present in the fuel being treated, more than the theoretical amount is required. The excess amount required will be that amount necessary to neutralize any deactivating agents. Obviously for the most economical practice of the invention, the fuel to which the silver compound is added should be as free of deactivating ingredients as possible.

The hydrocarbon fuels which may be treated in accordance with the present invention include practically any natural or synthetically derived hydrocarbon which is to be utilized in any precisely adjusted mecahnical device. Fuels which are particularly applicable in the process herein intended are petroleum distillate fuels boiling in the range of from 20° to about 400° C. such as aviation gasolines, aviation jet fuels such as heptane, kerosene and so forth. It is further contemplated that normally gaseous hydrocarbons boiling as low as about −200° C. may be effectively stabilized when maintained in the liquid state. Thus, liquid methane, ethane, propane, butane, and so forth may be treated in the present invention. These hydrocarbon fuels may contain additives to prevent oxidation, increase octane or cetane rating; as well as minor amounts of impurities such as water, acids, and mercaptans.

While the presently intended microorganism inhibitors may be added by practically any known mixing technique, it is frequently found that silver compounds may be most economically and conveniently added by way of a novel filtering technique. This novel filtering technique involves passing the fuel to be treated through a conventional solid and/or water removing filter structure, the element of which is impregnated with finely divided (colloidal) silver microorganism deactivating agent. By utilizing a filter apparatus of this configuration it is found that an extremely large surface area of the silver compound may be exposed to the fuel being treated, thereby achieving rapid and efficient solution of the agent in the fuel. The use of the conventional filter elements so treated with silver compound yields the additional advantage of filtering out large contaminating materials simultaneously with treating the fuel with an antimicroorganism compound.

Conventional filter media which may be impregnated with heavy metal agents are naturally derived organic fibers such as cotton; and inorganic filter media such as diatomaceous earth, metal shavings and glass. It is also found that synthetic resin beads also provide a satisfactory support for the herein contemplated silver derivatives.

A simple and effective method for preparing the filter media used in the present invention involves the saturation of a filter element with a solution of silver cation. Next a solution of the desired anion is passed through the cation saturated element, whereupon a silver salt will precipitate upon and within the interstices of the filter element.

Having generally described the essential elements of the present invention, the following examples are given to illustrate specific embodiments thereof.

For use in the following specific examples, a test fuel sample was made up which comprised approximately 90 parts by weight of JP-4 fuel and 10 parts by weight of water to which had been added inorganic nutrients salts.

The specific composition of the water portion, the well known Bushnell-Hass solution, is as follows:

| | | |
|---|---|---|
| $NH_4NO_3$ | grams | 1.0 |
| $MgSO_4$ | do | 0.2 |
| $CaCl_2$ | do | 0.02 |
| $KH_2PO_4$ | do | 1.0 |
| $K_2HPO_4$ | do | 1.0 |
| $FeCl_3$ | do | 0.01 |
| Distilled water | liters | 1 |

The test microorganisms used to determine the effectiveness of the presently disclosed treatment were organisms which had from bottom sludge in JP-4 (jet fuel) fuel storage tanks. These organisms, which include both fungi and many species of bacteria, were found to be capable of multiplying rapidly in hydrocarbon fuels which contain water and minerals. Other tests similar to those described below gave the same results when a pure stain of bacteria was used.

EXAMPLE I

A filter media was prepared by first saturating a 100 g. sample of Celite (diatomaceous earth) maintained in a filter funnel with an aqueous 2% solution of silver nitrate. The saturated Celite was then treated with an excess of an aqueous 5% solution of sodium oleate whereupon a precipitate of silver oleate was deposited throughout the body of Celite. This prepared filter was then washed several times with distilled water to remove any uncombined material.

A 150 ml. sample of the JP-4 fuel sample was passed through the filter. Portions of the filtered fuel designated as F-5 were combined with various amounts of control fuel and an equal volume of sterile water and minerals, then inoculated with equal portions of microorganism culture and incubated for 30 days at room temperature on a rotary shaker. The results given in the table below were apparent after 10 days and did not change during the remainder of the test.

*Table*

| Sample | Fuel Phase | $H_2O$ Phase | Growth |
|---|---|---|---|
| 1 | Control | Control | Yes. |
| 2 | F-5 | do | No. |
| 3 | 50% F-5; 50% Control | do | No. |
| 4 | 40% F-5; 60% Control | do | No. |
| 5 | 30% F-5; 70% Control | do | No. |
| 6 | 20% F-5; 80% Control | do | No. |
| 7 | 10% F-5; 90% Control | do | Yes.[1] |
| 8 | 5% F-5; 95% Control | do | Yes. |
| 9 | Control | do | Yes. |

[1] Growth here was slower than in samples 1 or 9.

The above data indicate the silver oleate dissolves in the fuel phase. The concentration of the silver oleate in F-5 fuel phase was about one-half part per million. The above data further illustrate that the silver oleate is effective even when the treated fuel is diluted to the extent to 5 to 1, thus it is found the silver oleate is effective in concentrations as low as 0.1 part per million.

EXAMPLE II

A contaminated 300 ml. sample of the test JP-4 fuel-water mixture was prepared by first inoculating the sample with the microorganism culture and then incubating the sample for 3 days at room temperature. The sample was then passed through the silver oleate-Celite filter described in Example I and plated on a series of petri dishes. It was found that neither the aqueous nor the fuel phase contained viable microorganisms. This test shows that the fuel sample was actually sterilized.

EXAMPLE III

Samples of about 50 ml. of commercial jet fuel were admixed with the various amounts of several silver compounds given in following table. Then each solution was diluted to the concentration shown.

| Compound: | Measured $Ag^+$ (p.p.m.) |
|---|---|
| Silver butyrate | 1.1 |
| Silver valerate | 1.1 |
| Silver caproate | 0.9 |
| Silver toluene sulfonate | 1.1 |
| Silver dimethyl benzene sulfonate | 0.8 |
| Silver dibutyl phosphate | 1.5 |

92.00 ml. portions of each inoculated with a viable microorganism culture from fuel storage tanks along with 1.00 ml. of Bushnell-Hass solution. No visible sign of growth was observed after 5 days incubation at room temperature. Five blank tests with no silver compound supported a luxuriant growth under the conditions of the experiment. This test was continued another 2 weeks with no change in the results.

EXAMPLE IV

To illustrate the necessity of selecting a silver compound which possesses solubility in both hydrocarbon and in water 50 ml. samples of commercial jet fuel were treated with 1.0 mg. each of (1) silver dodecyl mercaptide which is soluble in hydrocarbon and insoluble in water; (2) silver sulfate which is soluble in water but insoluble in hydrocarbon; and (3) silver oleate which is soluble in water and in hydrocarbon. The samples were shaken, then filtered to remove undissolved material, then 2.00 ml. portions were mixed with Bushnell-Hass solution and inoculated with 1.00 ml. of microorganisms. The samples were incubated at 25° C. for 10 days then examined for microorganism development. The results are tabulated below:

| Silver Compound | Growth | Ag Conc. fuel (p.p.m.) | Ag Conc. water (p.p.m.) |
|---|---|---|---|
| (1) Ag dodecyl mercaptide | Yes | 0 | 0 |
| (2) Ag sulfate | Yes | 0 | 0 |
| (3) Ag oleate | No | 10 | 10 |
| (4) Blank | Yes | 0 | 0 |

The above data indicates when silver is not found in both the hydrocarbon and water phases, microorganism growth will occur. The silver content of both the fuel and water phases was determined at the end of the incubation period by means of AC arc emission spectroscopy.

The above specific examples clearly illustrate that hydrocarbon fuels may be effectively stabilized against microorganism development by the addition of very minor portions of heavy metal antimicroorganism agents thereto. Therefore, it is seen that the present invention provides a simple, economical, and convenient means by which those utilizing hydrocarbon fuel may easily maintain fuel free from microorganism contamination.

We claim:

1. A hydrocarbon fuel stabilized against undesired microorganism growth, which comprises a liquid hydrocarbon boiling between —200 and 400° C., and from about 10 parts per billion to about 10 parts per million by weight of a silver compound dissolved therein, said silver compound being characterized by possessing a solubility in said hydrocarbon and in water of at least 10 parts per billion, and selected from the group consisting of silver carboxylates of monomeric monocarboxylic acids, silver sulfonates, silver dithiocarbamates, silver sulfates, silver phosphates, and silver acetylides.

2. The composition of claim 1 wherein the silver compound is silver oleate.

3. The composition of claim 1 wherein the silver compound is silver butyrate.

4. The composition of claim 1 wherein the silver compound is silver caproate.

5. The composition of claim 1 wherein the silver compound is silver dimethyl benzene sulfonate.

6. The composition of claim 1 wherein the silver compound is silver dibutyl phosphate.

7. The composition of claim 1 wherein the silver compound is silver toluene sulfonate.

References Cited by the Examiner

UNITED STATES PATENTS

| | | | |
|---|---|---|---|
| 2,141,848 | 12/1938 | Adams et al. | 44—68 |
| 2,230,642 | 2/1941 | Fischer et al. | 44—68 |
| 2,546,421 | 3/1951 | Bartholomew et al. | 44—68 |
| 2,562,488 | 7/1951 | Fuchs | 167—22 |
| 2,655,460 | 10/1953 | Kise | 167—22 |
| 2,927,052 | 3/1960 | Moudry | 167—22 |
| 2,975,042 | 3/1961 | Summers | 44—78 |
| 2,975,043 | 3/1961 | Ambrose | 44—78 |
| 3,050,467 | 8/1962 | Horowitz | 252—107 |

FOREIGN PATENTS 395,570  7/1933  Great Britain.

DANIEL E. WYMAN, *Primary Examiner.*

Y. M. HARRIS, *Assistant Examiner.*